United States Patent [19]

Earl

[11] 4,298,175
[45] Nov. 3, 1981

[54] AIRPLANE WING AND UNDERCARRIAGE CONSTRUCTION

[75] Inventor: T. Desmond Earl, Buffalo, N.Y.
[73] Assignee: Textron Inc., Providence, R.I.
[21] Appl. No.: 22,527
[22] Filed: Mar. 21, 1979
[51] Int. Cl.$^3$ .......................... B64C 1/00; B60Y 3/08
[52] U.S. Cl. ................................ 244/13; 244/100 A; 244/101; 244/105
[58] Field of Search ........... 244/100 R, 100 A, 102 R, 244/36, 12.1, 13, 101, 105, 107

[56] References Cited

U.S. PATENT DOCUMENTS

| | | | |
|---|---|---|---|
| 3,070,327 | 12/1962 | Dornier et al. | 244/100 R |
| 3,342,278 | 9/1967 | Cocksedge | 244/12.1 |
| 3,462,100 | 8/1969 | De Valroger | 244/100 R |
| 3,738,597 | 6/1973 | Earl et al. | 244/102 R |
| 4,019,698 | 4/1977 | Earl | 244/100 A |

*Primary Examiner*—Charles E. Frankfort
*Attorney, Agent, or Firm*—Bean, Kauffman & Bean

[57] ABSTRACT

There is disclosed an airplane having an inflatable type air cushion confining undercarriage thereunder wherein the airplane wing structures comprise three-dimensionally enlarged inner wing components merging aerodynamically with the airplane fuselage. The under surfaces of the inner wing components and the fuselage cooperate to provide a downwardly convex broad base structure which is oval-shaped in planform, and a toroidal configured inflatable trunk is attached to the perimeter of the base structure for circumscribing the air cushion cavity under the airplane. Thus, an enlarged width and length air cushion type undercarriage is provided to give the airplane improved stability characteristics when operating in air cushion, ground, or water supported mode. When the trunk system is deflated the elastic sheet material thereof retracts snugly against the slightly convex bottom surface of the base structure.

5 Claims, 12 Drawing Figures

IN FLIGHT – BAG DEFLATED

TOUCH DOWN – AIR LUBRICATION

ROLL OUT – CUSHION BORNE

BRAKES CONTACTING GROUND

4,298,175

AIRPLANE WING AND UNDERCARRIAGE CONSTRUCTION

FIELD OF THE INVENTION

This invention relates generally to aircraft employing air cushion type undercarriage systems such as shown for example in U.S. Pat. Nos. 3,275,270; Reissue 26,812; 3,738,597; 3,790,110; 3,964,698; 3,981,462; 3,990,658; 4,004,761 and 4,077,589; as well as triphibious airplane constructions such as are capable of floating on water surfaces and taking off and landing/resting on water/hard runways/fields/snow and ice covered surfaces/marshy terrain; and the like.

BACKGROUND OF THE INVENTION

As set forth in the above referenced patents, the air cushion type undercarriage concept for airplanes provides many advantages over prior type skid, pontoon, and/or wheel type systems; in that basically the air cushion undercarriage system when properly applied enables an airplane to land/rest/take-off from a large variety of surfaces as aforesaid. However, previously proposed air cushion type undercarriage systems have inherently encountered either performance or structural complication problems which have handicapped advancement and pragmatic acceptance of the basic advantages of the airplane air cushion undercarriage concept. Prior designs employed structurally obvious engineeringly advantageous designs based on air cushion supply boundary trunk support means as typically provided under the main aircraft structural frame/fuselage/hull of the airplane, and/or extensible outriggers therefrom. In consequence the lateral (anti-roll) support "track width" thereof (which controls stability in roll characteristics of the airplane during landing-/take-off/flotation operations) has been heretofore undesirably limited by necessary trade-off design considerations. These include; what are the available sheet materials of desired elasticity capabilities for use in fabricating the trunk system, and/or should there be employed a mechanically complicated trackwise extension equipment such as suggested for example in U.S. Pat. No. 4,004,761?

The present invention provides a basic solution to the aforesaid problems in that it contemplates a novel frontal and planform profile airplane wing design, in combination with an improved "track width" configured air cushion supply elastic trunk arrangement. The term "maximum track width" as will be used hereinafter refers to the maximum outside width dimension of the inter-surface reaction effect of the trunk (when inflated) with a runway/water surface or the like as explained hereinabove. This may also be referred to as the "outside footprint width" dimension of the undercarriage; which determines the stability in roll (or "roll stability") characteristics of the craft when in air cushion and/or ground/water support regime. By virtue of this invention, an increased "track area" is obtained without excess demands upon current technology in the elastic and air-impervious sheet fabric manufacturing process; and also without requiring employment of mechanically complicated /expensive and aerodynamically handicapping extensible-retractable outrigger arrangements such as have been suggested by the prior art, with a view to improving the anti-roll stability characteristics of an airplane with operating in the air cushion undercarriage supported mode.

SUMMARY OF THE INVENTION

The present invention contemplates employment in an airplane design of a novel combination wing structure and air cushion circumscribing/supply trunk arrangement; whereby a variety of low or mid-wing airplane designs may obtain improved "wide-track" air cushion type undercarriage system operating characteristics, and wherefore the above mentioned disadvantages of the prior art are overcome. Furthermore, the invention provides for an improved metacentric height when floating upon a water surface either on its inflated trunk or on its watertight hull. The term "metacentric height" as used herein means the distance between the center of gravity and the metacenter of a floating body. It is also a particular feature of the present invention in that it reduces demands upon the elastic extension capabilities of the air cushion surrounding trunk sheet forming material as will be further explained hereinafter. These and other advances in the art will be apparent from the following detailed specification which describes by way of example a presently preferred form ("best mode") of the invention; although it is to be understood that the invention is readily applicable to a variety of other airplane design configurations.

BRIEF DESCRIPTION OF THE DRAWINGS

FIG. 11 illustrates how when the bag system is inflated, the airplane may land and/or cruise with improved anti-roll stability characteristics upon water surfaces, whereas FIG. 12 illustrates how the craft may float upon its water-tight hull.

SPECIFICATION

Figure 4:
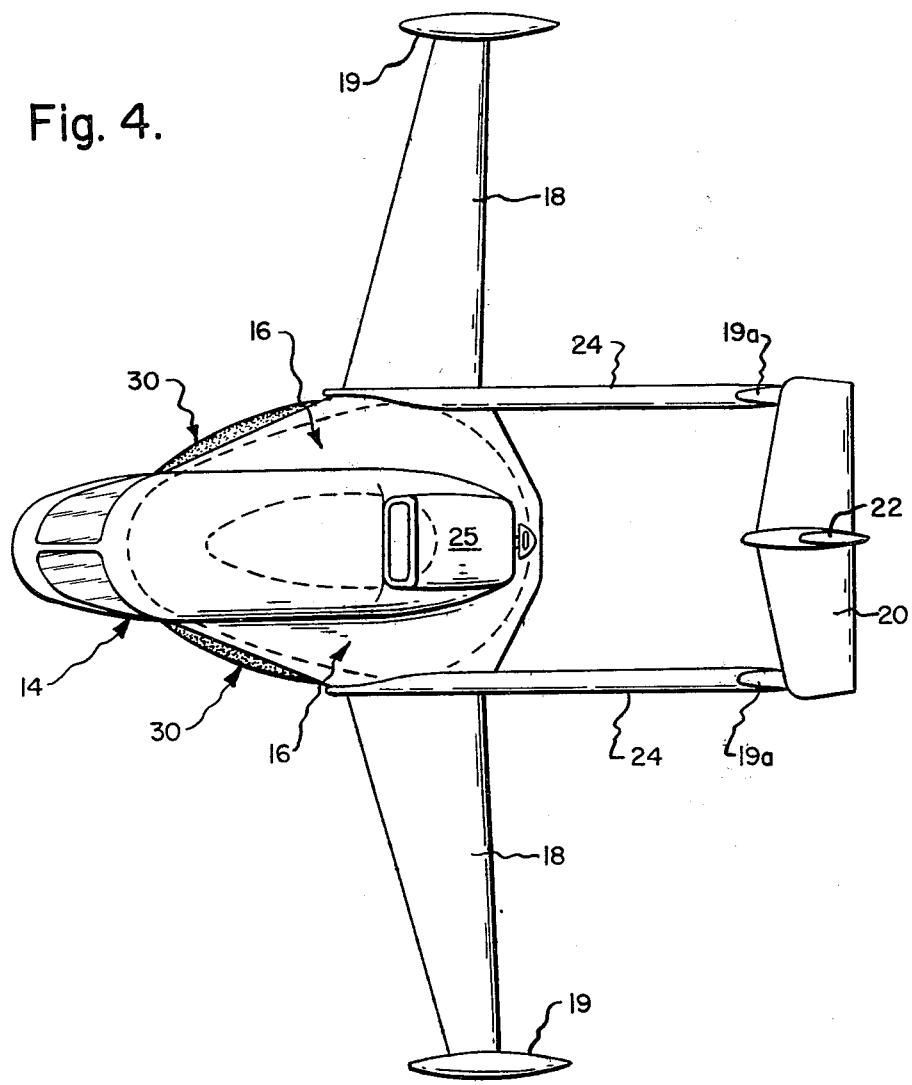
FIG. 4 is a plan view of the airplane of FIGS. 1–3.
Figure 5:
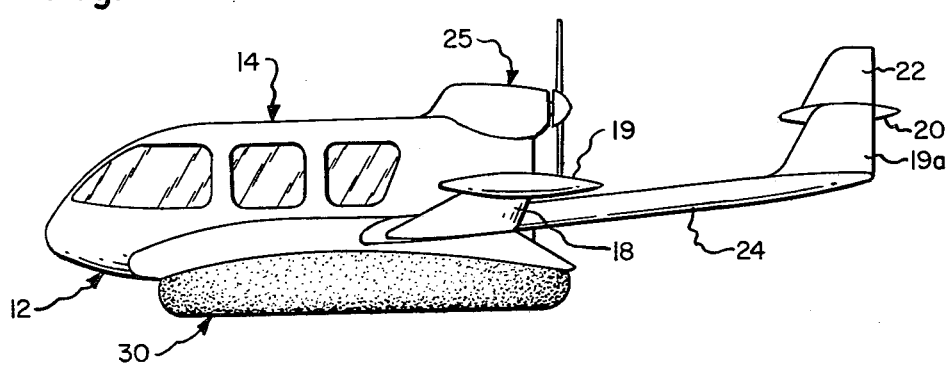
FIG. 5 is a side elevational view thereof showing the inflated condition of the air cushion undercarriage system.
Figure 6:
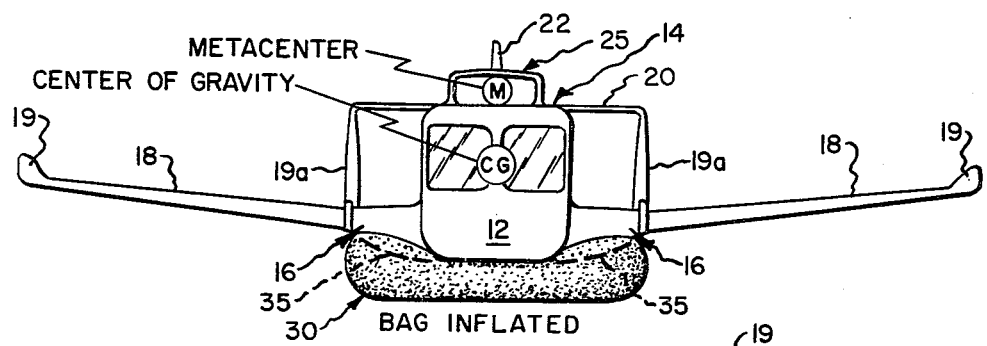
FIG. 6 is a front elevational view of the airplane of FIGS. 1–5, showing the air cushion confining trunk in inflated operative condition.

As shown by way of example in the drawing herewith, the invention is embodied in a low wing airplane design of the twin tail boom type, and wherein the base or fuselage structure thereof includes a water-tight hull 12 carrying a passenger cabin 14. Inner wing structures 16—16 extend laterally from opposite sides of the fuselage from which further extend wing panels 18—18 carrying wing tip fuel tanks 19—19. The empennage including fins 19a—19a, stabilizer/elevator 20, and rudder 22, is carried by twin booms 24—24. Such basic type aircraft is well known in the art. However, note that as best shown at FIGS. 1, 2, 4 and 6, in the case of the present invention the profiles of the inner wings 16—16 of the airplane are enlarged three dimensionally in depth and laterally and longitudinally of the airplane planform. Note also that the bottom of the hull 12 and the external surfaces of the inner wing members 16—16 and of the wing panels 18—18 are shaped so as to provide improved flight aerodynamic performance while accommodating improved internal support structures for the wing and inner wing fabrications; as well as to provide for the airplane a track-width extended air cushion undercarriage support surface of ovate or egg-shaped planform with the broad end of such shape located behind the wing center line, as shown in FIG. 4, which results in improved airplane roll stability characteristics.

Figure 1:
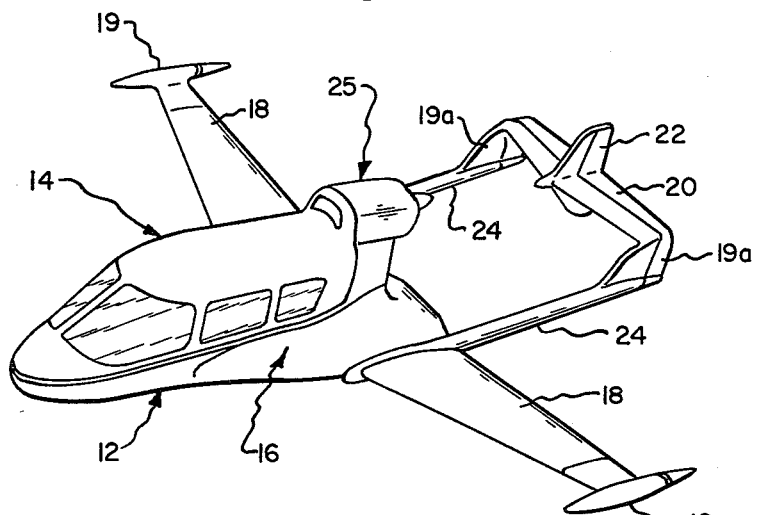
FIG. 1 is an overhead perspective view of an airplane such as may typically employ a wing/undercarriage system of the present invention.
Figure 2:
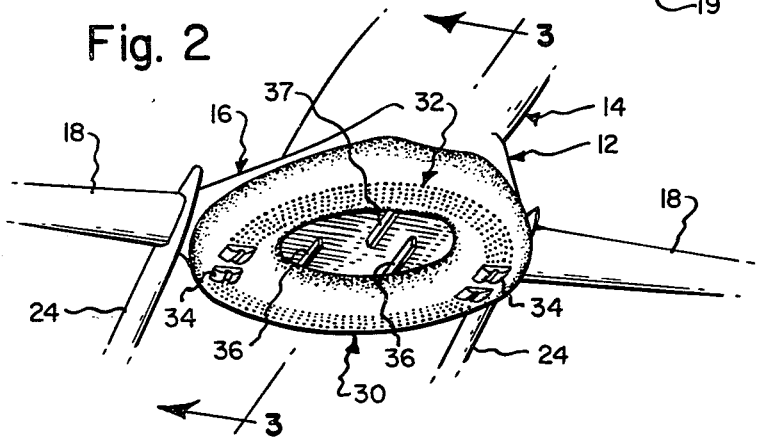
FIG. 2 is a fragmentary underneath perspective view, on enlarged scale, such as of the airplane of FIG. 1.
Figure 3:
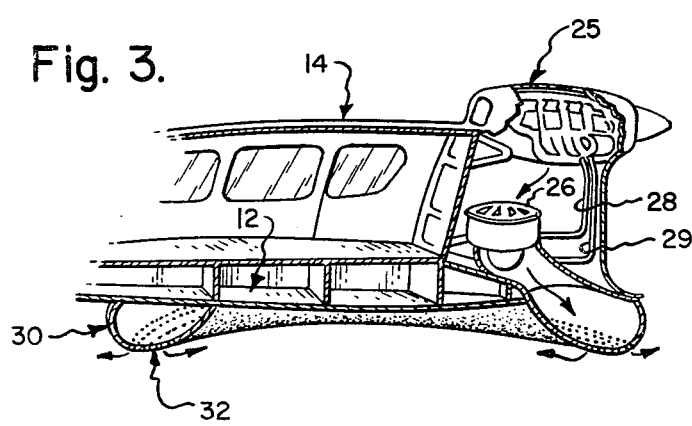
FIG. 3 is a fragmentary transverse sectional view taken as suggested by 3—3 of FIG. 2.

The airplane propulsion unit is shown by way of example as an engine/propeller unit 25; and in this case the air cushion supply fan is illustrated at 26 (FIG. 3) as being driven via a hydraulic pressure conveying conduit 28 from an enginedriven pump and return conduit 29; although it is to be understood that the air cushion air supply may alternatively be by means of any other preferred device such as a bleed from the low pressure stage of a fan jet engine. However, in any case the preferred form of air cushion supply means will permit reversion of the air cushion supply power to the airplane propulsion system as soon as take-off is effected; and in any case (as illustrated by way of example at FIG. 3) the fan will be arranged to discharge into and thereby pressurize and establish the air cushion surrounding inflated trunk 30.

As shown herein by way of a preferred example, the trunk is generally of toroidal shape conforming to the egg-shaped perimeter of the support surface; whereby, when the trunk is inflated the center of pressure thereof is disposed forwardly of the center of aerodynamic lift of the airplane, as can be seen from FIG. 4. The trunk 30 is preferably perforated throughout its "footprint" areas as illustrated at 32, in accord with air cushion supply/air-lubrication techniques described in my earlier U.S. Pat. Nos. 3,738,597; 3,790,110; Reissue 26,812; 3,964,698; and the like. Also note that as illustrated at 34—34 (FIG. 10) ground-run brake devices are preferably employed such as are disclosed in my earlier U.S. Pat. No. 4,019,698, to facilitate shortening of hard surface ground-run landing operations.

Figure 7:
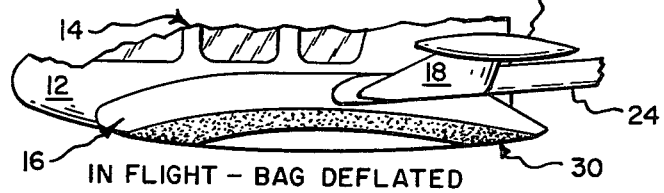
FIGS. 7–10 are diagrammatic side elevational views illustrating how the pitch attitude of an airplane of the present invention may be maneuvered throughout a series of in-flight/touchdown/roll-out/braking operations.

FIGS. 7-10 illustrate in series how an airplane incorporating the present invention may be operated to revert from an in-flight mode to a hard-surface landing regime. FIG. 7 shows the aircraft in flight with the air cushion undercarriage bag 30 deflated and elastically clinging flatwise in aerodynamically efficient manner against the bottom surfaces of the fuselage and inner wings 16—16. As shown by broken lines 35—35 in FIG. 6 (which is a front elevational view) and as shown in FIG. 7 the bottom surfaces of the inner wing structures against which the deflated trunk sheet material retracts are preferably slightly downwardly convex shaped in order to obtain upon deflation snug fits of the sheet members against the inner wing surfaces.

Figure 8:
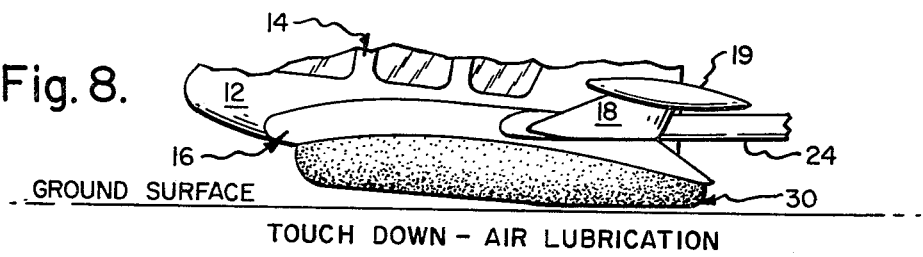
Figure 9:
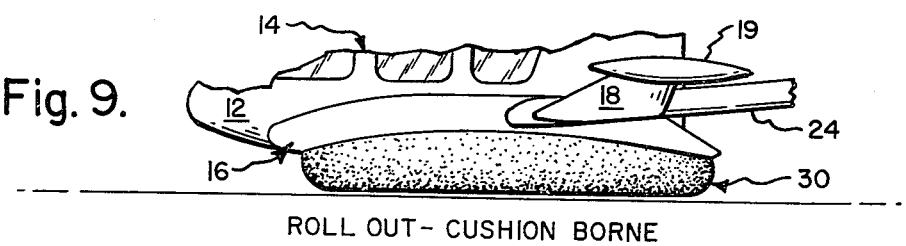
Figure 10:
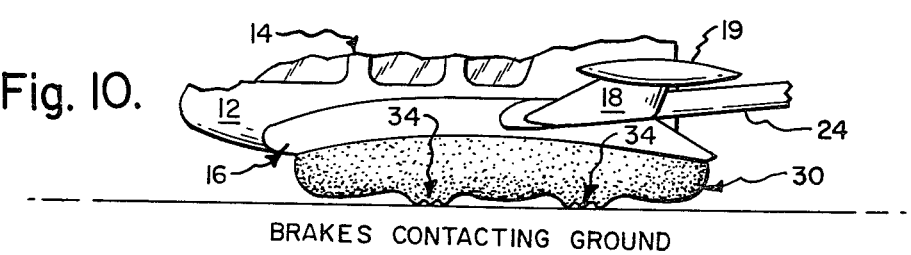

FIGS. 8-10 of the drawing illustrate how when the bag 30 is inflated to extend below the fuselage/wing assembly to furnish for the aircraft a ground surface reactive air cushion support system, the craft may sequentially touch down and then roll out its landing run while the tread or "footprint" portions of the bag are air-lubricated relative to the surface; and how the airplane may then be brought to a stop by extension of brake devices 34 (such as are for example shown in my U.S. Pat. No. 4,019,698). Throughout these maneuvers the roll stability characteristics of the craft are markedly enhanced by reason of the wide track form of the undercarriage air cushion system of the present invention. Ground rest/slide runners such as are shown at 36—36 and 37 (FIGS. 2, 11 and 12) of wear-resistant material are preferably furnished under the hull of the craft, to provide durable parking and ground run adjuncts to the hull.

Figure 11:
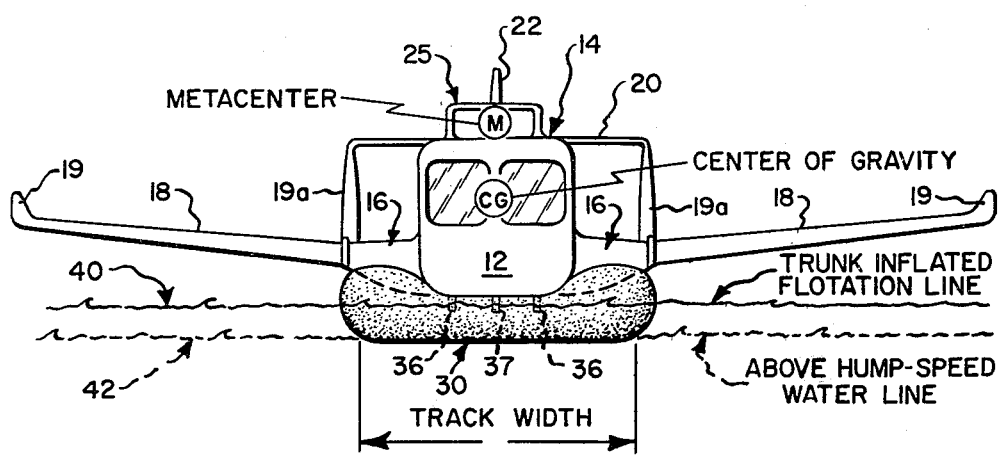
FIGS. 11–12 are views corresponding somewhat to FIGS. 6 and 7.
Figure 12:
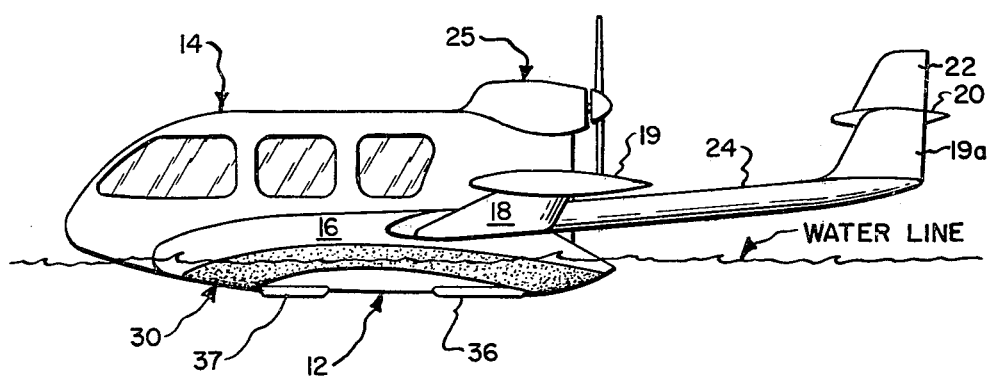

As illustrated at FIGS. 11-12 an airplane of the present invention may operate with improved anti-roll stability characteristics when floating upon a body of water; the height of the airplane metacenter M (FIGS. 6, 11) above the airplane center of gravity being importantly increased. As also shown therein the height of the airplane center of gravity relative to the air cushion support level is reduced to approximately 50% of the maximum outside width dimension of the air cushion footprint area. This track-width dimension, in accord with a preferred form of the invention, may be engineered to be at least 20% of the wing tip-to-tip span dimension in order to achieve structural strength and roll stability performance trade-off optimums.

FIG. 11 illustrates how subsequent to a "touch-down" and "roll-out" sequence relative to a water surface, the craft may be controlled to settle into a trunk-inflated flotation regime upon a water level such as is illustrated at 40. Also, FIG. 11 illustrates how during take-off from flotation regime the craft rises relative to the previous water level 40 until at above "hump speed" the trunk 30 is barely in contact with the water line as illustrated by the broken water level line 42. In any case, the metacenter of the craft is always importantly low relative to the maximum width of the air cushion track, whereby the craft is of improved roll stability characteristics compared to previous air cushion undercarriage arrangements. FIG. 12 illustrates how the craft floats upon its water-tight hull when the trunk 30 is deflated and the power plant is shut down.

What is claimed is:

1. An amphibious airplane having an inflatable trunk type air cushion confining undercarriage thereunder;

said airplane having a watertight fuselage and wing structures extending generally laterally thereof and merging therewith in aerodynamically efficient configuration;

said wing structures each comprising an outer wing component and an inner wing component which is three-dimensionally enlarged with respect to its outer wing component and which in frontal and sidewise views merges with said fuselage to provide an enlarged broad base support structure for said undercarriage as well as a smooth and aerodynamically efficient downwardly facing surface formed in part by said fuselage and said inner wing components, said inner wing components extending both forwardly and rearwardly of their outer wing components but to a greater extent forwardly thereof so that said surface is of egg-shaped planform with the broad end of such shape located behind the wing center line;

said undercarriage comprising an inflatable trunk of generally toroidal configuration formed of elastic sheet material mounted on and generally conforming to the egg-shaped perimeter of said surface; whereby, when said trunk is inflated the center of pressure thereof is disposed forwardly of the center of aerodynamic lift of said airplane and when the trunk is deflated said sheet material resiliently clings snugly against said surface, the maximum track-width of said trunk when inflated is at least 20% of the total wing span dimension of the airplane, the maximum track-width of said trunk when inflated is at least 60% greater than the metacenter height of the airplane, and the height of the airplane center of gravity from the air cushion support level is no more than 50% of the maximum track-width of said trunk when inflated.

2. An airplane as set forth in claim 1 wherein said downwardly facing surface against which said sheet material clings when said trunk is deflated is slightly downwardly convex shaped.

3. An airplane as set forth in claim 1 wherein said water-tight fuselage includes along its bottom surface ground-rest-slide runner means of wear-resistant material.

4. An airplane as set forth in claim 1 wherein said sheet material is discretely perforated through ground engaging portions thereof.

5. An airplane as set forth in claim 1 wherein ground engaging portions of said trunk are armored against friction deterioration, and wherein means are supplied to permit operator-controlled extension of said armored portions below the mean footprint level thereof for ground-run braking purposes.

* * * * *